Oct. 8, 1957 M. D. CHRISTIN 2,808,668

TELEPHONE DIALS

Filed Sept. 11, 1956

INVENTOR.
MANUEL D. CHRISTIN
BY J. Ledermann
ATTORNEY.

2,808,668
Patented Oct. 8, 1957

2,808,668

TELEPHONE DIALS

Manuel D. Christin, New York, N. Y.

Application September 11, 1956, Serial No. 609,258
1 Claim. (Cl. 40—10.5)

This invention relates to dial telephones, and the main object of the invention is the provision of new and useful improvements in the dial face as well as in the method of dialing numbers, whereby the dialling becomes more accurate and less prone to error as well as simpler and timesaving. The present invention is applicable to present telephone sets without any alteration whatever in the internal structure or working of the present dial, and it may also be provided in the form of an attachment applicable to any common or standard form of telephone set.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing, Fig. 1 is a top plan view of a telephone desk set illustrating one embodiment of the invention applied thereto.

Figures 1, 2, 3, 4:
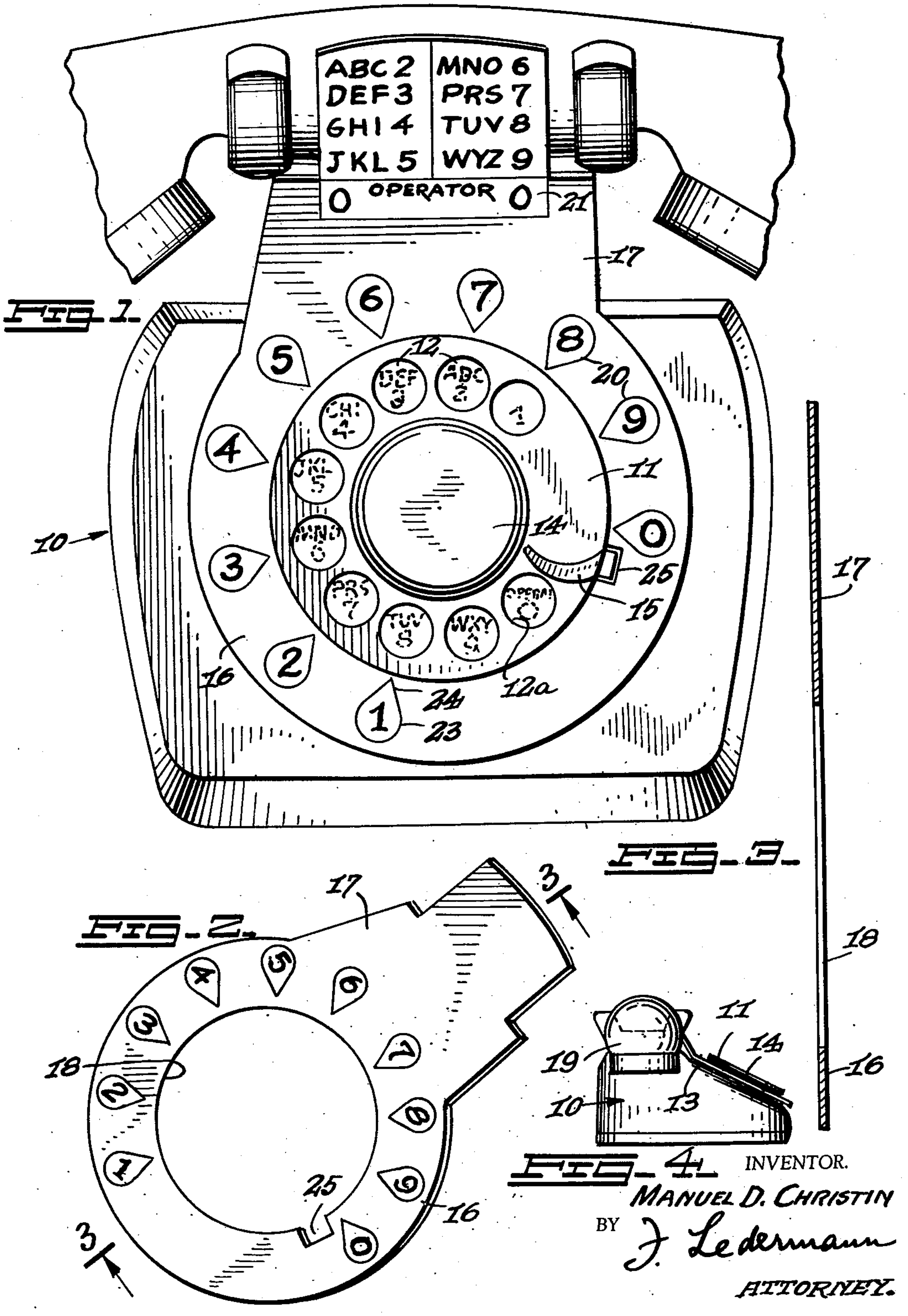
Fig. 2 is a plan view of the attachment of the present invention, per se, with the legends provided by the present invention omitted.
Fig. 3 is a sectional view taken on the line 3—3 of Fig. 2.
Fig. 4 is a side elevational view of the telephone set of Fig. 1.

Referring in detail to the drawing, the numeral 10 illustrates a common type of telephone set to which the invention is applicable, but it may of course be applied also to other dial telephone sets. Dial telephones have the dial ring 11, provided with the usual ten spaced round holes or openings 12 therein which are spaced one-twelfth of a circumference apart, parallel with the top wall 13 of the telephone base and fixed on an axial boss 14 rotatably mounted on the base and operatively connected with the internal dialling mechanism, not shown.

In such dial telephones, the visible surface of the top wall 13 of the base around the boss 14, with the ring 11 in its normal position shown in Fig. 1, is marked with similarly spaced and arranged legends shown, that is, each space below and visible through an opening 12 bears a series of call letters and a number, as shown in broken lines in Fig. 1, except that the space bearing number "1" bears no letters. The stop shown at 15, attached to the base of the set adjacent the tenth counter-clockwise legend, marks the limit of rotational movement in a clockwise direction of the ring 11 in dialling any given numeral or letter, as is well known.

In order to dial a call number, the user must first dial the call letters and then the number, and this combination of dialling movements and selection of the letters is confusing and frequently results in dialling a wrong number.

The present invention consists of an attachment in the form of a ring 16 having a tab extension 17 extending radially therefrom, the whole being cut out of a sheet or plate of suitable material. The internal diameter of the ring 16, that is the diameter of the central opening 18, is equal to the external diameter of the dialling ring 11 so that the ring 16 may be passed down over the ring 11, and it is positioned on the set 10 so that the tab 17 extends upward and is adapted to rest against the telephone housing portion 19. The ring is imprinted only with ten numbers 20 extending over ten-twelfths of a circumference and positioned one-twelfth of a circumference apart, and the numbers 20 are in the reverse order from those in the openings 12. In other words, the latter numbers are arranged in a counter-clockwise order whereas the numbers 20 extend in a clockwise order. The arc constituted by the numbers 20 is shifted clockwise through two-twelfths of a circumference with respect to the arc constituting the numbers behind the openings 12; that is, the former arc is two-twelfths of a circumference out of phase in a clockwise direction with respect to the former arc.

To take the place of the call letters "ABC" etc. appearing in each opening 12, a chart 21 is provided on the tab 17, readily visible to the user, from which he can quickly determine the numeral which is the equivalent of a call letter in dialling. For example, should the exchange to be called consist of the call letters "BE," the chart shows the numeral equivalent to "B" is "2" and that equivalent to "E" is "3." Thus, instead of searching for letters in the openings 12, the user need merely dial the numbers "2" and "3" before he dials the numerals in the number to be called.

When dialling a number in the standard dial, it is to be noted that the ring 11 is rotated on its axis a given arcuate distance. For example, the arcuate distance the ring 11 moves in dialling the number "1" is exactly that through which the opening 12*a* under the stop 15 moves, which is the distance between the legend under the opening 12*a* in Fig. 1 to the legend "TUV 8." Hence, the same number "1" may be dialed by putting one's finger in the opening 12*a* and moving the ring clockwise as far as the number "1" on the ring 16. Similarly, the number "6" may be dialed by putting one's finger in the opening 12*a* and swinging the ring to the numeral "6" on the ring 16; and so on throughout the entire range of numerals.

Hence, to dial a number with the present attachment, after each numeral is dialled the user leaves his finger in the opening 12*a* and returns the same to its original position against the bottom side of the stop 15, after which he proceeds to the next numeral on the ring 16, without removing his finger from the opening 12*a*. To additionally assure that his finger in swinging the ring 11 clockwise stops at the proper numeral on the ring 16, a small indicator 22 is attached to the edge of the opening 12*a* tapering to a point in radial alignment with the ring 11. Additionally, or instead of the indicator, each numeral 20 on the ring 16 may be enclosed by an endless line 23 terminating in an arrow head 24 radially aligned with the ring 11, or merely the arrow head portion 24 may be printed over each numeral 20.

To permit of attachment of the present invention to the set 10, a cut-out 25 is provided in the ring 16 to enable it to pass down over the stop 15. The entire attachment will be positioned frictionally in place, or any suitable means, not shown, may be provided to hold it stable.

Where a person is to apply the attachment to his own telephone, he can block out the annular surface of the area 13 under the ring 11 to conceal the standard numbers and letters of the dial. The attachment may be carried in the pocket by a person to be applied almost instantly to any other telephone that he may be required to use, and thus simplify his dialling.

A dialling system presented by the present invention would be particularly useful to persons who cannot read other than numerals, as is obvious, especially if the call numbers have been rearranged for him in accordance with the chart 21. Moreover, in dialling with the present invention the direction is from "right to left" instead of from left to right, which is believed to be the more natural way for people in most parts of the world and for many of foreign origin in the United States. The invention also offers additional advantages which it is believed unnecessary to enumerate.

I claim:

In combination with a standard dial telephone having a dial ring rotatably mounted in raised position above a surface of the telephone housing and having ten circumferentially spaced openings therethrough arranged side by side in an arc extending over ten-twelfths of a circumference and positioned one-twelfth of a circumference apart and having said surface provided with similarly arranged and spaced legends bearing different groups of call letters and numerals visible through said openings when the dial ring is in its normal inactive position with said numerals reading progressively in a counter-clockwise direction, the telephone having a finger stop positioned adjacent the 12th opening of said openings reading in counter-clockwise direction, a flat ring having the axial opening therethrough of the same diameter as the outer diameter of the dial ring passed over the dial ring and positioned substantially in the plane of said surface, said flat ring having ten circumferentially spaced numerals thereon arranged side by side in an arc extending over ten-twelfths of a circumference and positioned one-twelfth of a circumference apart and each of which is positioned radially outward from the dial ring, said last-named numerals being arranged to read progressively in a clockwise direction, said last-named arc being positioned out of phase with respect to said first-named arc a distance of two-twelfths of a circumference.

References Cited in the file of this patent

UNITED STATES PATENTS

| | | |
|---|---|---|
| 1,541,786 | Burgess | June 16, 1925 |
| 2,656,628 | Ravin | Oct. 27, 1953 |
| 2,676,427 | Martindale | Apr. 27, 1954 |
| 2,777,228 | Andrews | Jan. 15, 1957 |